Figure 1:
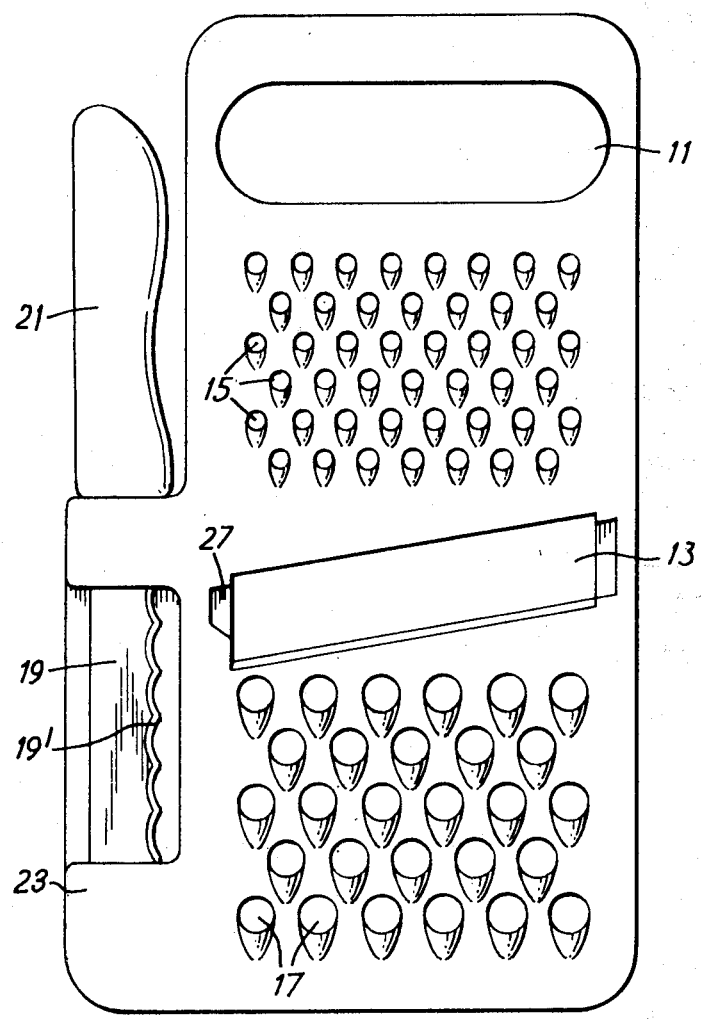

United States Patent [19]

Harris

[11] 4,281,460

[45] Aug. 4, 1981

[54] KITCHEN UTENSIL

[76] Inventor: David P. Harris, 16 Warrington Crescent, London W9, England

[21] Appl. No.: 91,333

[22] Filed: Nov. 5, 1979

[30] Foreign Application Priority Data

Nov. 7, 1978 [GB] United Kingdom ............... 43569/78
Jun. 4, 1979 [GB] United Kingdom ............ 193229/79

[51] Int. Cl.³ .............................................. B26B 3/00
[52] U.S. Cl. .................................................... 30/278
[58] Field of Search ................. 30/124, 142, 143, 278; 7/113; 269/15, 16; 83/662

[56] References Cited

U.S. PATENT DOCUMENTS

| 190,875 | 5/1877 | Kuchinka | 30/278 |
| 414,908 | 11/1889 | Hirschel | 7/113 |
| 748,255 | 12/1903 | Berry | 269/16 |

FOREIGN PATENT DOCUMENTS 1148265 4/1969 United Kingdom ..................... 30/278

*Primary Examiner*—Jimmy C. Peters
*Attorney, Agent, or Firm*—Henry R. Lerner

[57] ABSTRACT

A food grater and slicer comprises a flat surface having a series of holes with associated protrusions providing the grating action and a slot having associated therewith a blade (19) which provides the slicing action. The blade (19) is removable to enable it to be sharpened and to be used as a conventional knife.

1 Claim, 2 Drawing Figures

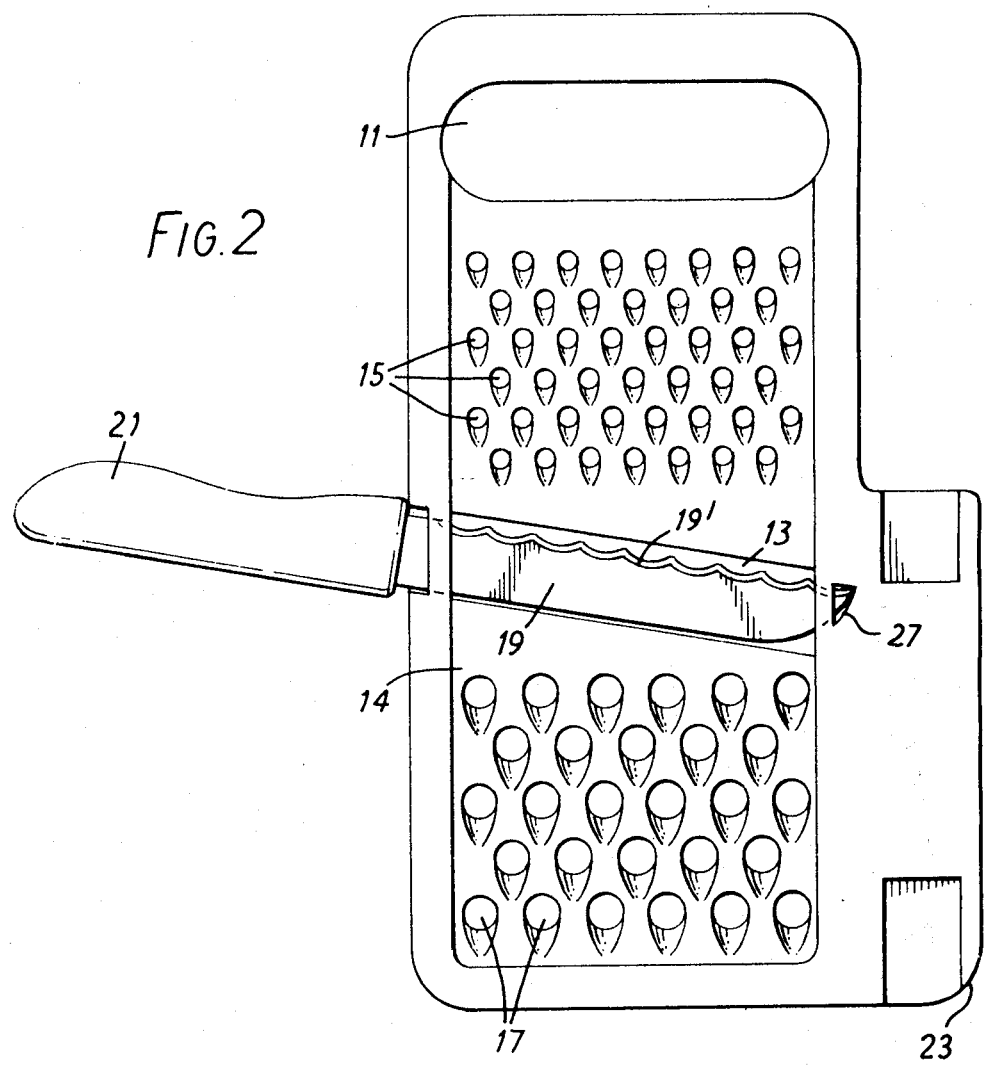

KITCHEN UTENSIL

The present invention relates to a kitchen utensil and seeks to provide an improved food grater and slicer.

It is known to provide a food grater comprising a surface formed with a plurality of holes each having a marginal portion protruding from the surface, which portions form cutting edges for food rubbed across the surface. It is also known to provide on such grater a slot having a longitudinally extending protruding marginal portion forming a cutting edge for slicing food.

According to the present invention there is provided a food slicer and grater comprising a surface formed with a plurality of holes, each having associated therewith a portion protruding from one side of the said surface, which protruding portions form cutting edges for grating food rubbed across the said one side of the surface, a longitudinal slot in the surface and means for removably mounting adjacent the slot at a fixed distance from the other side of the surface a blade which provides a slicing edge when mounted adjacent the slot.

As will be appreciated, this arrangement provides a more efficient slicer, since the blade can be removed for sharpening.

Preferably, the blade is provided with a handle which, when the blade is mounted adjacent the slot for slicing extends from the surface and can be held by the user to steady the slicer in use. Moreover, the blade and handle may be used, independently of the surface, as a knife.

Advantageously, the surface includes means for mounting the blade in an inoperative position clear of the slot and holes.

The invention will now be described by way of example with reference to the accompanying drawings, in which:

FIG. 1 is a front view of the food slicer and grater embodying the invention showing the blade in an inoperative position and FIG. 2 is a rear view of the slicer and grater of FIG. 1 showing the blade in the slicing position.

The slicer and grater is formed of a sheet of moulded plastics material of substantially rectangular shape, formed with a large opening 11 at one end which provides a hand grip. In the centre of the sheet is a longitudinally extending slot 13, which extends across the sheet and is aligned at an angle to the short sides of the sheet.

In use, the grater is held essentially vertically with the opening 11 uppermost and the term "top" and "bottom", "above" and "below" and "upper and lower" as used hereinafter refer to this inuse orientation.

As best seen in FIG. 2, the sheet has relatively thick marginal portions and a relatively thin central portions 14, so that one side of the sheet is substantially flat and the other side has a central recessed portion.

On the same side of the slot 13 as the opening 11, in the portion 14 of the sheet, are a series of small, circular holes 15 arranged in a regular array and each having a lower marginal portion protruding from the surface on one side thereof. The protrusions extend away from the holes and merge with the surface of the sheet at a short distance below the holes.

A second series of holes 17, larger than the holes 15, are arranged below the slot 13, also in the portion 14 of the sheet, and are similarly provided with marginal protruberances.

The holes 15 and 17, with their associated protruding portions, provide graters for food rubbed across the said one side of the surface.

FIG. 1 also shows a blade 19, provided with a handle 21 which is removable mounted along one of the longer edges of the sheet in a relatively thicker marginal portion 23. Associated with the slot 13 are means for removably securing the blade 19 adjacent the slot 13 in a position with its cutting edge 19' at a fixed distance from the said other side of the sheet. These means comprise a slot 25 in one side of the sheet at one end of the slot 13 and a recess 27 in the rear side of the sheet at the other end of the slot 13. When used as a slicer, the blade 19 is withdrawn from the inoperative position shown in FIG. 1 and inserted through at slot 25, with its cutting edge uppermost, until its tip rests in the recess 27 at which position the blade 19 is securely held at a fixed position relative to the slot and food can be sliced by sliding it down the smooth rear surface of the sheet and against the cutting edge of the knife.

I claim:

1. A food slicer and grater comprising a generally rectangular plate having an integrally formed sheath along one edge thereof, said sheath adapted to receive and store a knife having a blade and a handle, said sheath covering both ends of said knife blade, intermediate the ends the knife blade being covered on one side, said plate further having along one edge perpendicular to said knife receiving edge a handle, said plate further being generally bisected into a top half and a bottom half by a slicer slot adapted to receive the knife from the storage position and expose a cutting edge on the knife at a preselected distance away from a flat side of the plate, said slot having a pair of integral superimposed ribs, transverse to the knife blade to support the knife blade at each end, said plate having on the other side a plurality of holes having protruding portions to form a cutting edge to grate food, one plurality of holes above the slicer slot, a second plurality of holes being of a different dimension at a position below the slicer opening.

* * * * *